United States Patent [19]

Palazzetti et al.

[11] 4,034,271
[45] July 5, 1977

[54] ELECTRICAL DISTRIBUTION SYSTEMS FOR MOTOR VEHICLES

[75] Inventors: Mario Palazzetti, Avigliana (Turin); Franco Grisotto, Turin, both of Italy

[73] Assignee: Fiat Societa per Azioni, Turin, Italy

[22] Filed: Feb. 12, 1976

[21] Appl. No.: 657,553

[30] Foreign Application Priority Data

Feb. 27, 1975 Italy .................................. 67492/75

[52] U.S. Cl. .......................... 361/332; 307/10 R; 307/147
[51] Int. Cl.² ...................... H02B 1/04; H02B 1/20
[58] Field of Search ............. 307/12, 38, 39, 10 R, 307/147, 155, 156; 317/99, 112

[56] References Cited

UNITED STATES PATENTS 3,715,627  2/1973  D'Ausilio .......................... 307/147

*Primary Examiner*—Gerald P. Tolin
*Attorney, Agent, or Firm*—Christie, Parker & Hale

[57] ABSTRACT

An electrical distribution system suitable for use on motor vehicles where electric current is to be supplied selectively to one or more electric power consuming devices, wherein there is provided a main power carrying conductor and a plurality of signal carrying lines which energize one or more of a plurality of actuators to interconnect the power line to a selected electrical device, in which the power line is in the form of a metal strip of sufficient rigidity that the actuators can be mounted thereon by a mounting which also makes electrical contact thereto.

5 Claims, 2 Drawing Figures

U.S. Patent    July 5, 1977    4,034,271

ELECTRICAL DISTRIBUTION SYSTEMS FOR MOTOR VEHICLES

BACKGROUND OF THE INVENTION

The present invention relates to electrical systems, and in particular to an electrical distribution system for use on a motor vehicle.

Electrical distribution systems for motor vehicles conventionally comprise a plurality of individual wires which interconnect an electrical power source comprising a battery and a generator, a panel of control switches, and each individual electrical current consuming device of the vehicle. The wires from the control switches to the electrical devices, such as front and rear lights, windscreen wiper, horn, ignition system etc., all follow different routes through the vehicle between the control switches and the electrical devices themselves. The number and complexity of these routes gives rise to considerable problems of construction and assembly.

Attempts to overcome these problems have been made by making electrical systems for motor vehicles using a single current-carrying conductor to feed the electrical devices under the control of a number of control wires in groups in the form of a microcable with a plurality of control wires, which follow a single route through the vehicle. Systems have also been made in which the current-carrying conductor is associated with a single control wire carrying coded signals so as to be able to control, as the coded signals change, the various different electrical devices of the vehicle.

All of these systems rely on the provision, for each electrical device, or group of devices which operate at the same time, of an actuator associated with the device or group of devices and operable to connect the power line with the associated electrical device or group of devices when the actuator is operated by a signal on the corresponding control wire. There arise, therefore, problems of positioning and fixing for these actuators, which must be connected both to the power line and to the control line.

OBJECT OF THE INVENTION

The object of the present invention is to provide an electrical distribution system for a motor vehicle, of the type using a single power line and a plurality of control lines to distribute power selectively to one or more of a plurality of electrical devices by means of a plurality of actuators, in which the mounting of the actuators is provided in a simple and rational manner.

SUMMARY OF THE INVENTION

According to the present invention an electrical distribution system for motor vehicles, for selectively distributing electrical power to one or more electrical devices of the vehicle, comprises an electric current conductor, a control cable, and a plurality of actuators operable to interconnect the said conductor and a selected electrical device or group of devices in dependence on signals received along the control cable, in which the electrical current conductor is in the form of a metal strip and the actuators are directly mounted on the strip.

Various other features and advantages of this invention will become apparent during the course of the following description with reference to the accompanying drawings, which is provided purely by way of non-restrictive example.

DESCRIPTION OF THE PREFERRED EMBODIMENT

Figure 1:
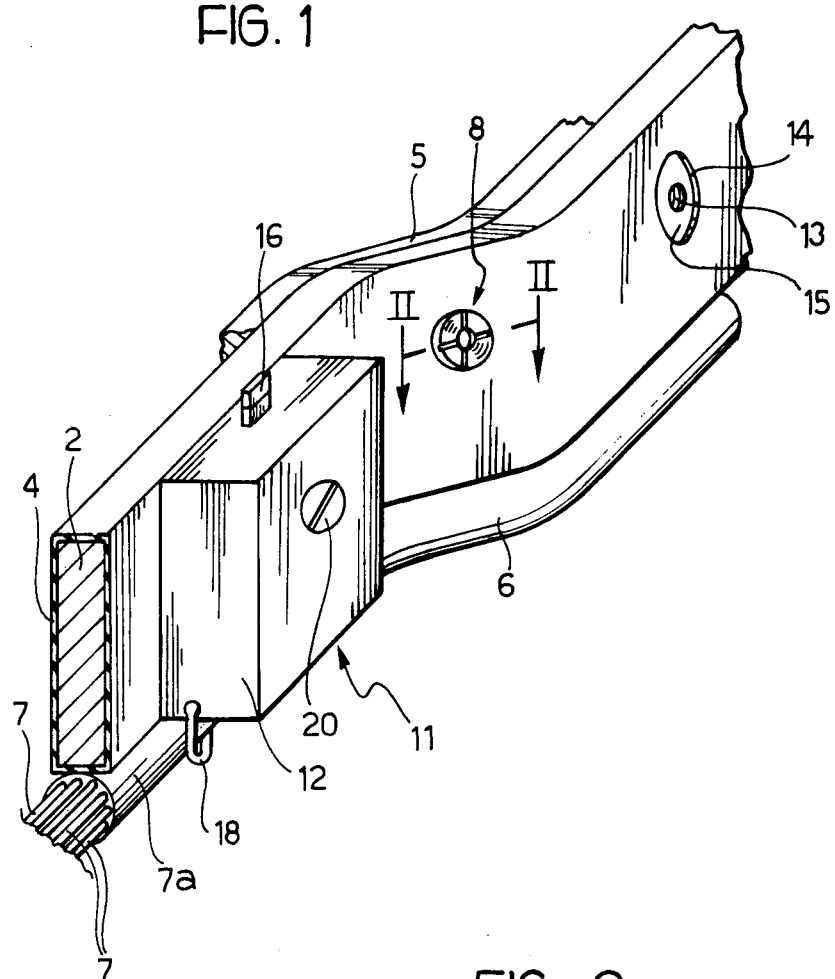
FIG. 1 is a perspective view of a short section of an electrical installation for a motor vehicle, formed as an embodiment of the invention.
Figure 2:
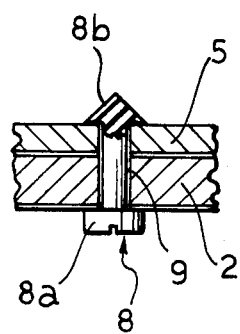
FIG. 2 is a scrap section on the line II—II of FIG. 1.

In FIG. 1 is shown a short section of an electric current carrying conductor in the form of a metal strip 2, having a rectangular cross section and covered by a casing 4 of insulating material or with a layer of insulating varnish. The conductive strip 2 is curved so as to follow the curve of the body of the vehicle on which it is mounted; a short section of the body on which the strip is mounted is indicated by the reference numeral 5 in FIGS. 1 and 2.

A multiwire microcable 6 comprising a plurality of insulated wires 7 enclosed in an outer casing 7a, is secured, for example by means of hooks, underneath the strip 2 so as to follow this along its length. The microcable 6 leads from a control panel (not shown).

The conductive strip 2 is attached to the body by means of fixing elements 8 of insulating materials in the form of resilient clips or buttons, each comprising a stem or shank having at one end a head 8a and at the other end a conical resilient enlarged retaining foot 8b. The retaining button 8 is shown in detail in FIG. 2. Each of these retaining buttons 8 is inserted through a hole 9 in the conductive strip 2 and its casing 4, and through a hole 9a in the body panel 5 of the vehicle to which the conductive strip 2 is mounted, with the head 8a against one side of the strip and the resilient foot 8b projecting from the body panel 5 of the body, so that the strip 2 is held firmly between the body panel 5 and the head 8a of the fixing button.

In the vicinity of each electrical device of the vehicle there is mounted an actuator 11 which acts, when energised, to connect that electrical device (not shown) with the conductive strip 2. The actuator 11 is encased in a casing 12 of insulating material, and is secured to the strip 2 by forming at the point where the actuator 11 is to be mounted, a threaded hole 13 in the thickness of the strip 2. The insulating casing 4 is removed over a circular area 14 coaxial with the threaded hole 13, thus leaving exposed the underlying area 15 of the surface of the strip 2. Each actuator 11 is secured to the strip by means of a screw 20 of conductive material, which is passed through a hole (not shown) in the casing 12 of the actuator 11 and screwed into the threaded hole 13. The exposed head of the screw 20 is then covered for safety with insulating material.

The operative element of each actuator may be, for example, a transistor (not shown) housed within the casing 12, which transistor is put into conduction when an appropriate control signal is fed to its base by the corresponding wire of the microcable to which the base is connected by a short conductor 18 projecting from the casing 12. The emitter of each transistor is connected to the exposed area 15 of the strip 2, for example by means of a small wire and a conductor element screwed on the screw 20 and pressed against the area 15, and the collector of the transistor is connected to a contact 16 projecting from the casing 12, to which the corresponding electrical device of the vehicle is connected.

The connection of the conductor 18 to the corresponding wire of the microcable 6 can be carried out for example as described in U.S. Pat. No. 3,934,337, that is by first stripping off a portion of the external casing of the microcable, and then using a process of dielectric perforation of the insulating material of the wire by applying a suitably high potential between the conductor 18 and the wire of the microcable to which it is to be joined.

In operation of the system, when the driver wishes to operate a given electrical device, he moves the appropriate switch and a control signal is transmitted to the base of the transistor of the actuator 11 connected to the required device, along the corresponding wire of the control microcable 7. This signal makes the transistor conductive thereby allowing current to flow from the conductive strip 2, where the exposed area 15 is connected to the emitter of the transistor, to the electrical device connected to the terminal 16 which is connected to the collector of the transistor.

The details of the embodiment illustrated in the drawing and described above can, of course, be varied without departing from the scope of this invention as defined in the following claims. For example, in the embodiment described the control signals are transmitted through a multiwire microcable, but alternatively, instead of a microcable, a cable of conventional wires could be used, each wire of the control cable being of such a length that it extends only from the control panel of the vehicle to the actuator which it is to control, and is connected to the base of the transistor of this actuator. In systems in which coded signals are used on a single control wire, each electrical device must be provided with a suitable decoder.

In the embodiment particularly described each electrical device is provided with its own actuator, but it will be apparent that each actuator could be connected to a plurality of devices which all operate simultaneously (for example the front and rear lamps) and that each casing 12 could contain more than one actuator 11.

We claim:
1. In a motor vehicle electrical distribution system of the type operating selectively to distribute electrical power to one or more electrical devices of the vehicle, and comprising:
   an electric current conductor,
   a control cable, and
   a plurality of actuators operating to interconnect said electric current conductor and a selected one of said electrical devices or a selected group of said electrical devices in dependence on signals received along said control cable,
   the improvement wherein:
   said electric current conductor is in the form of a metal strip, and
   said actuators are each directly mounted on said metal strip.

2. The electrical distribution system of claim 1, wherein each of said actuators is electrically connected to said metal strip at a single contact region.

3. The electrical distribution system of claim 2, wherein said contact region of electrical connection between said metal strip and an actuator corresponds to the point of mechanical connection therebetween.

4. The electrical distribution system of claim 1, wherein there are provided a plurality of resilient insulating clips or buttons securing said conductive strip to the body of a motor vehicle.

5. A motor vehicle fitted with the electrical distribution system of claim 1, wherein said conductive strip is curved so as to follow closely the curve of the body of said vehicle along the length of said strip.

* * * * *